United States Patent
Shin

(10) Patent No.: US 6,549,543 B1
(45) Date of Patent: Apr. 15, 2003

(54) DATA COMMUNICATION SYSTEM AND DATA COMMUNICATION OPERATING METHOD

(75) Inventor: Seung Mok Shin, Seoul (KR)

(73) Assignee: LG Information & Communications Ltd., Seoul (KR)

( * ) Notice: Subject to any disclaimer, the term of this patent is extended or adjusted under 35 U.S.C. 154(b) by 0 days.

(21) Appl. No.: 09/223,177

(22) Filed: Dec. 30, 1998

(30) Foreign Application Priority Data

Dec. 15, 1998 (KR) ............................................ 98-55161

(51) Int. Cl.[7] ................................................. H04J 3/24
(52) U.S. Cl. ..................... 370/474; 370/320; 370/356; 370/398; 455/428; 375/222; 379/220.01
(58) Field of Search ................................. 370/474, 356, 370/289, 398, 342; 455/466, 469, 426, 428, 550, 557, 560, 561; 379/229, 220; 375/222

(56) References Cited

U.S. PATENT DOCUMENTS

| 5,610,910 A | * | 3/1997 | Focsaneanu et al. | ........ 370/351 |
| 5,850,391 A | * | 12/1998 | Essigmann | .................. 370/331 |
| 5,940,383 A | * | 8/1999 | Willkie | ........................ 370/336 |
| 5,963,860 A | * | 10/1999 | Muths et al. | ............... 455/412 |
| 6,057,943 A | * | 5/2000 | Kweon et al. | .............. 358/435 |
| 6,111,866 A | * | 8/2000 | Kweon et al. | .............. 370/335 |
| 6,176,280 B1 | * | 12/2000 | Barrett et al. | ............... 455/466 |
| 6,192,041 B1 | * | 2/2001 | Phillips | ...................... 370/338 |
| 6,201,965 B1 | * | 3/2001 | Mizell et al. | ............... 455/433 |
| 6,349,224 B1 | * | 2/2002 | Lim | .......................... 455/575 |

* cited by examiner

Primary Examiner—Dang Ton
Assistant Examiner—Tri H. Phan
(74) Attorney, Agent, or Firm—Fleshner & Kim, LLP

(57) ABSTRACT

A data communication system and data communication operating method capable of providing a asynchronous data communication service to a public switching telephone network, X.25 network, and Internet by extensively applying a packet assembler deassembler (PAD) function to an interworking function device provided in a code division multiple access (CDMA) type data communication system. If a certain mobile station requests the asynchronous data service, the data communication system analyzes the condition of terminating information inputted by a user of the mobile station, and selectively connects the mobile station to a public switching telephone network, X.25 network, and Internet according to the result of analysis.

33 Claims, 8 Drawing Sheets

DATA COMMUNICATION SYSTEM AND DATA COMMUNICATION OPERATING METHOD

BACKGROUND OF THE INVENTION

1. Field of the Invention

The present invention relates to a data communication system and data communication operating method. In particular, the present invention relates to a data communication system and data communication operating method which can provide a data communication service by selectively routing to a public switching telephone network (PSTN), X.25 network, and Internet by extensively applying a packet assembler deassembler (PAD) function to an interworking function device provided in a code division multiple access (CDMA) type data communication system.

2. Description of the Related Art

Generally, the network structure of an asynchronous circuit data service (service option 4,12) using the CDMA system recommended by TIA/EIA/IS-99/657/658 is illustrated in FIG. 1.

Referring to FIG. 1, a user of a mobile station requests the asynchronous circuit data service using an AT command. At this time, a mobile phone 2 combined with a data terminal 1 which can be selected among a notebook, personal digital assistant (PDA), laptop, palmtop, portable computer, compact computer, etc., may be used as the mobile station. According to the present invention, it is assumed that the data terminal is the notebook. As is well known, the mobile phone, i.e., the mobile terminal 2 seizes a base transmission station (BTS) 3, and is connected to a mobile switching center (MSC) 5 through a base station controller (BSC) 4.

A mobile subscriber processing section 51 in the mobile switching center 5 then analyzes the service option when it receives a call connection request from the mobile terminal 2. At this time, the service option may be classified in accordance with connection/disconnection of the data terminal 1 and the mobile terminal 2 and the inputted AT command. If the user requests the asynchronous circuit data service, a mobile data path is determined from a mobile data path processing section 52 of the mobile switching center 5 to a mobile data path processing section 61 of an interworking function device (IWF) 6 as a communication path. Thereafter, the mobile terminal 2 and a protocol processing section 62 of the interworking function device 6 determine a point-to-point protocol (PPP) and TCP/IP through the determined mobile data path. If the TCP/IP is determined, the mobile terminal 2 transmits the AT command, which has been recognized or has not been recognized, to an IS-99 protocol processing section 63 of the interworking function device 6.

The IS-99 protocol processing section 63 of the interworking function device 6 seizes a modem, and processes the contents recommended by the EIA/TIA/IS-99 with respect to the AT command.

Especially with respect to an ATD command, the IS-99 protocol processing section 63 analyzes a next command following the ATD command, extracts a terminating number, and then connects a call to the public switching telephone network path processing section 65 of the interworking function device 6. The public switching telephone network path processing section 65 requests the call to a public switching telephone network path processing section 54 of the mobile switching center 5 by using the terminating number extracted from the IS-99 protocol processing section 63. The public switching telephone network path processing section 54 of the mobile switching center 5 detects whether the terminating number corresponds to the terminating call to the mobile subscriber or the terminating call to the public switching telephone network by analyzing the terminating number. In case of the terminating call to the public switching telephone network 10, the public switching telephone network path processing section 54 connects the call to a wired terminal connected to the public switching telephone network 10 of the mobile switching center 5 through a trunk processing section 53 of the mobile switching center 5. However, in case of the terminating call to the mobile subscriber, the public switching telephone network path processing section 54 searches location information of the subscriber by communicating with a home location register (HLR) or a visitor location register (VLR). At this time, if the terminating call is the call for the subscriber of the intra mobile switching center as the result of search, the public switching telephone network path processing section 54 connects the call to the interworking function device 6 through the public switching telephone network path processing section 54 of the mobile switching center, while if the terminating call is the call for the subscriber of the inter mobile switching center, it connects the call to another mobile switching center through the trunk processing section 53.

However, according to the conventional network structure, only the calls with the public switching telephone network 10 can be processed in case of the asynchronous circuit data service (service option 4, 12). Accordingly, in the CDMA type data communication system, the data communication service with the X.25 network and Internet, which are generally used, cannot be provided by the asynchronous circuit data service option.

Further, the user should necessarily input the terminating number in order to receive the CDMA asynchronous circuit data service, and should remember the IP server connection numbers in order to connect with the IP servers of the public switching telephone network 10, using the asynchronous circuit data service.

Furthermore, in order for the user to process the terminating call to the public switching telephone network 10, a waiting time which is longer than that in the wired network is required for identifying the connection state with a wired terminal connected to the public switching telephone network. Specifically, the connection time between the mobile station and the mobile switching center 5, and the protocol negotiation time between the protocol processing section 62 of the interworking function device 6 and the mobile terminal 2 are required. The negotiation time may be varied according to the radio environment, and may be about 4 to 10 seconds. Also, the negotiation time between the modem 64 of the interworking function device 6 and the modem 7 connected to the public switching telephone network 10 may be about 7 to 10 seconds.

SUMMARY OF THE INVENTION

Accordingly, the present invention is directed to a data communication system and data communication operating method that substantially obviate one or more of the problems due to limitations and disadvantages of the related art.

An object of the present invention is to provide a data communication system and data communication operating method which can provide data communication service to a public switching telephone network, X.25 network, and Internet by extensively applying a packet assembler deassembler (PAD) function to an interworking function device of a CDMA type data communication system.

It is another object of the present invention to provide a data communication system and data communication operating method which can receive an asynchronous circuit data service without inputting a terminating number, and which can connect with an IP server of a public switching telephone network using an asynchronous circuit data service without the necessity of remembering an IP server connection number.

It is still another object of the present invention to provide a data communication system and data communication operating method which can provide a waiting time faster than that in a wired network in case of identifying the connection state with a wired terminal connected to a public switching telephone network.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the data communication system is characterized in that if a certain mobile station requests a data service, the data communication system analyzes the condition of terminating information inputted by a user of the mobile station, and selectively connects the mobile station to a public switching telephone network, X.25 network, and Internet.

In another aspect of the present invention, there is provided a data communication operating method comprising the steps of determining a data transmission path between a certain mobile station and an interworking function device if the mobile station requests a data service, analyzing the condition of terminating information inputted by a user of the mobile station, and selectively connecting the mobile station to a public switching telephone network, X.25 network, and Internet according to the result of analyzing the condition of terminating information.

According to the present invention as described above, a mobile station can be selectively connected to a public switching telephone network, X.25 network, and Internet by extensively applying a PAD function to an interworking function device during an asynchronous circuit data service. Also, a menu for connecting with a host server of the X.25 network, Internet, and public switching telephone network is provided to a terminal user by applying an extensive terminal number analyzing function to the PAD, and thus a call from the mobile station is connected to the respective host server of the X.25 network, Internet, and public switching telephone network if the menu is selected, while the call is connected to a mobile switching center if another number is inputted. Also, according to the present invention, it is not required for the user to remember the connection number of the host server. Specifically, since the connection menu is transmitted from the PAD of the interworking function device to the terminal user before the complete connection to the wired network, the terminal user can receive a response menu faster than the wired network, thereby enabling a very convenient data service.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
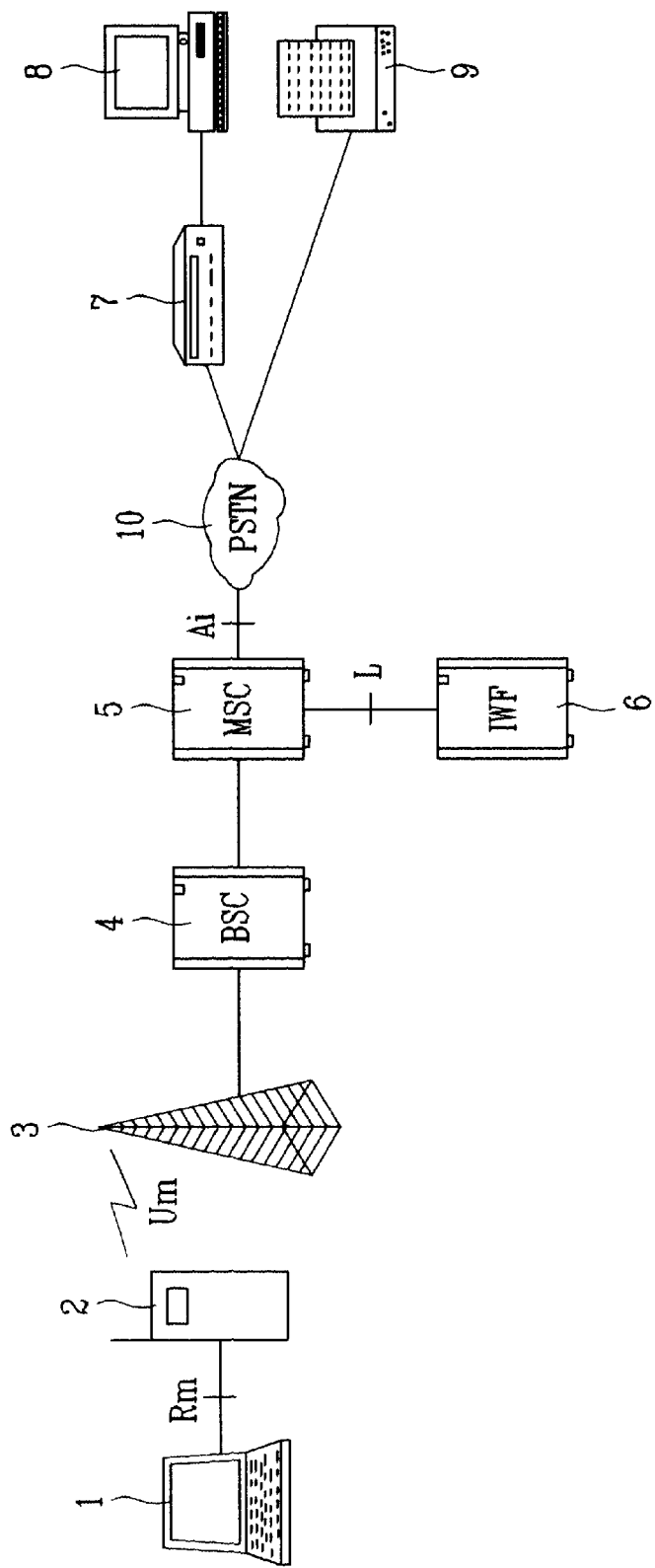
FIG. 1 is a view illustrating the structure of the circuit data service network in a conventional CDMA type data communication system.
Figure 2:
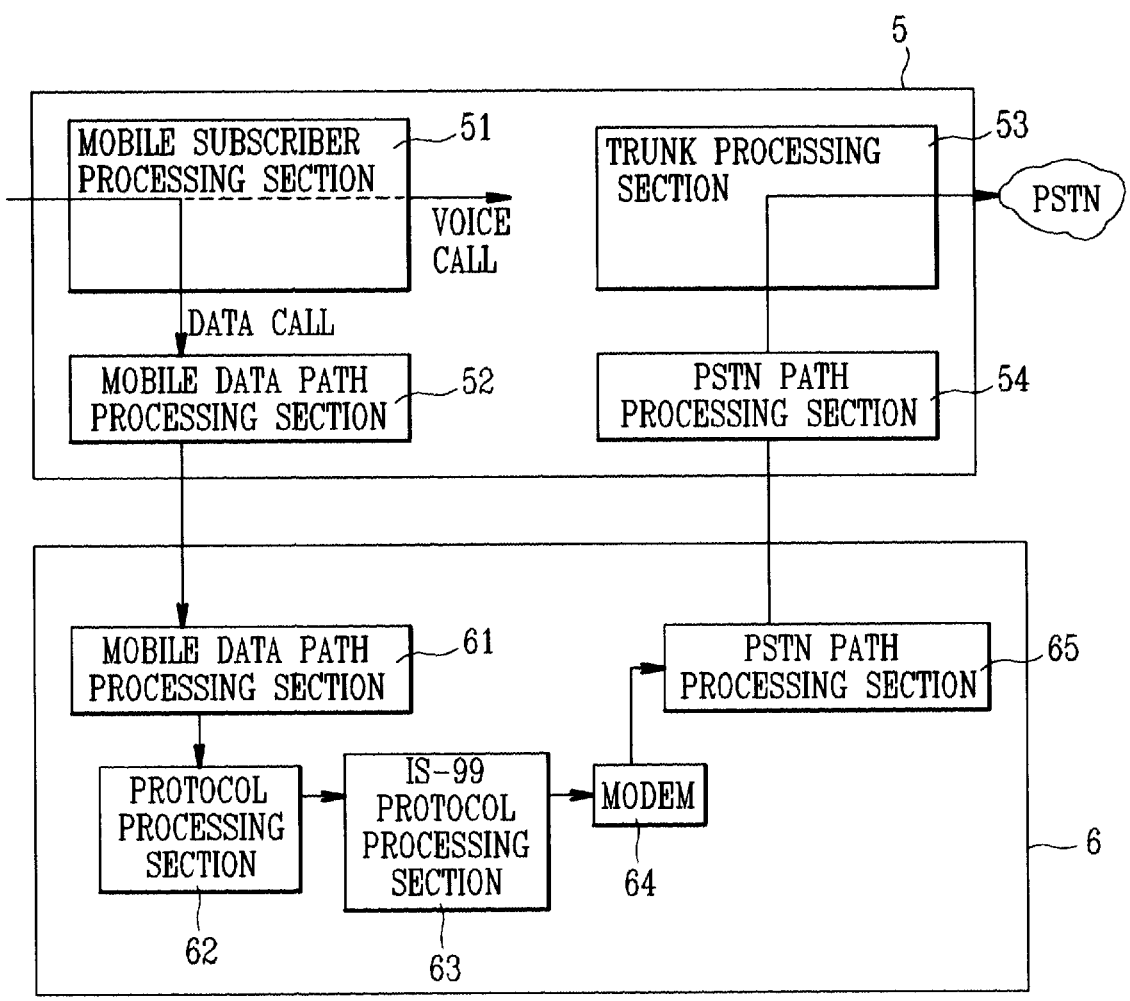
FIG. 2 is a block diagram explaining the call process operation during the asynchronous circuit data service in a conventional CDMA type data communication system.
Figure 3:
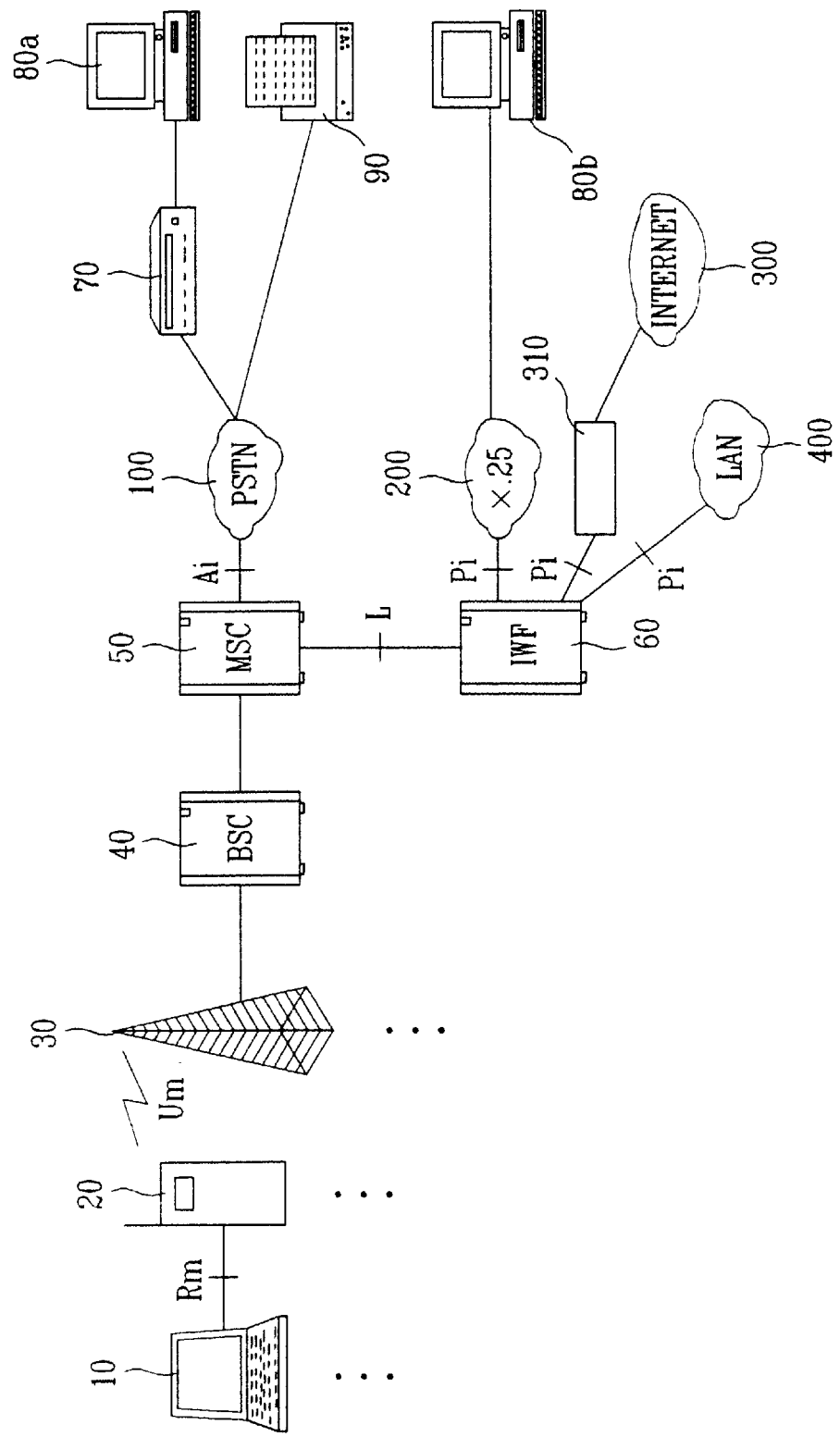
FIG. 3 is a view illustrating the structure of the circuit data service network in a CDMA type data communication system according to the present invention.

FIG. 3 is a view illustrating the structure of the circuit data service network in a CDMA type data communication system according to the present invention.

Referring to FIG. 3, the CDMA data communication system according to the present invention includes a plurality of mobile station (MS) 20, a plurality of base transmission station 30 for repeating the radio communications of the mobile stations in terms of region, a base station controller 40 for controlling the operation of the respective base stations 30, a mobile switching center 50 for determining a communication path in accordance with a communication service required by the mobile station 20, an interworking function device 60, connected to the mobile switching center 50, for interworking with an public switched telephone network 100 or an X.25 network 200 or an Internet 300, and a router 310 for performing a routing operation so that the interworking function device 60 is connected to the Internet 300.

Here, it is preferable that a protocol processing section 62, IS-99 protocol processing section 63, and PAD processing section 66 are installed on the same hardware.

Also, a subscriber such as an enterprise can connect with a desired communication network by connecting the interworking function device 60 directly to a LAN 400, not through the router 310.

The mobile subscriber processing section 51 of the mobile switching center 50 analyzes whether the call is the voice call or data call according to the service option determined by the user, and if the call is the data call, it connects the data call to the mobile data processing section 52. The trunk processing section 53 interworks with the public switching telephone network 100.

Also, the mobile data path processing section 52 provided in the mobile switching section 50 and the interworking function device 60, respectively, performs a frame relay interface recommended by EIA/TIA/IS-658.

The interworking function device 60 comprises a mobile data path processing section 61 for performing a frame relay interface recommended by EIA/TIA/IS-658, a protocol processing section 62 for performing a point-to-point protocol (PPP: RFC 1661), Internet protocol (IP: RFC 791), and transmission control protocol (TCP: RFC 793) with the mobile station 20 in accordance with a path determination of the mobile data path processing section 61, an IS-99 protocol processing section 63 for analyzing terminating information inputted by a user and then transmitted through the protocol processing section 62, a PAD processing section 66 for receiving a terminating number extracted by the IS-99 protocol processing section 63 and transmitting to the mobile station 20 a PAD service menu stored therein, or discriminating whether the terminating number included in the terminating information corresponds to a subscriber of a public switching telephone network 100, X.25 network 200, or Internet 300, a communication modem 64 for connecting with the IS-99 protocol processing section 63 if the terminating number is discriminated by the PAD processing section 66 to correspond to the subscriber of the public switching telephone network 100, a public switching telephone path processing section 65 for connecting the communication path to the public switching telephone network 100, an X.25 protocol processing section 67 for connecting the communication path to the X.25 network 200 if the terminating number is discriminated by the PAD processing section 66 to correspond to the subscriber of the X.25 network 200, and a PPP server 320 for determining a packet data link with the mobile station and the Internet 300 if the terminating number is discriminated by the PAD processing section 66 to correspond to the subscriber of the Internet 300.

Here, if the IS-99 protocol processing section 63 transfers the terminating number following an ATD command to the PAD processing section 66, the PAD processing section 66 analyzes the terminating number.

The operation of the data communication system according to the preferred embodiment of the present invention will now be explained with reference to FIGS. 3 to 8.

Figure 4:
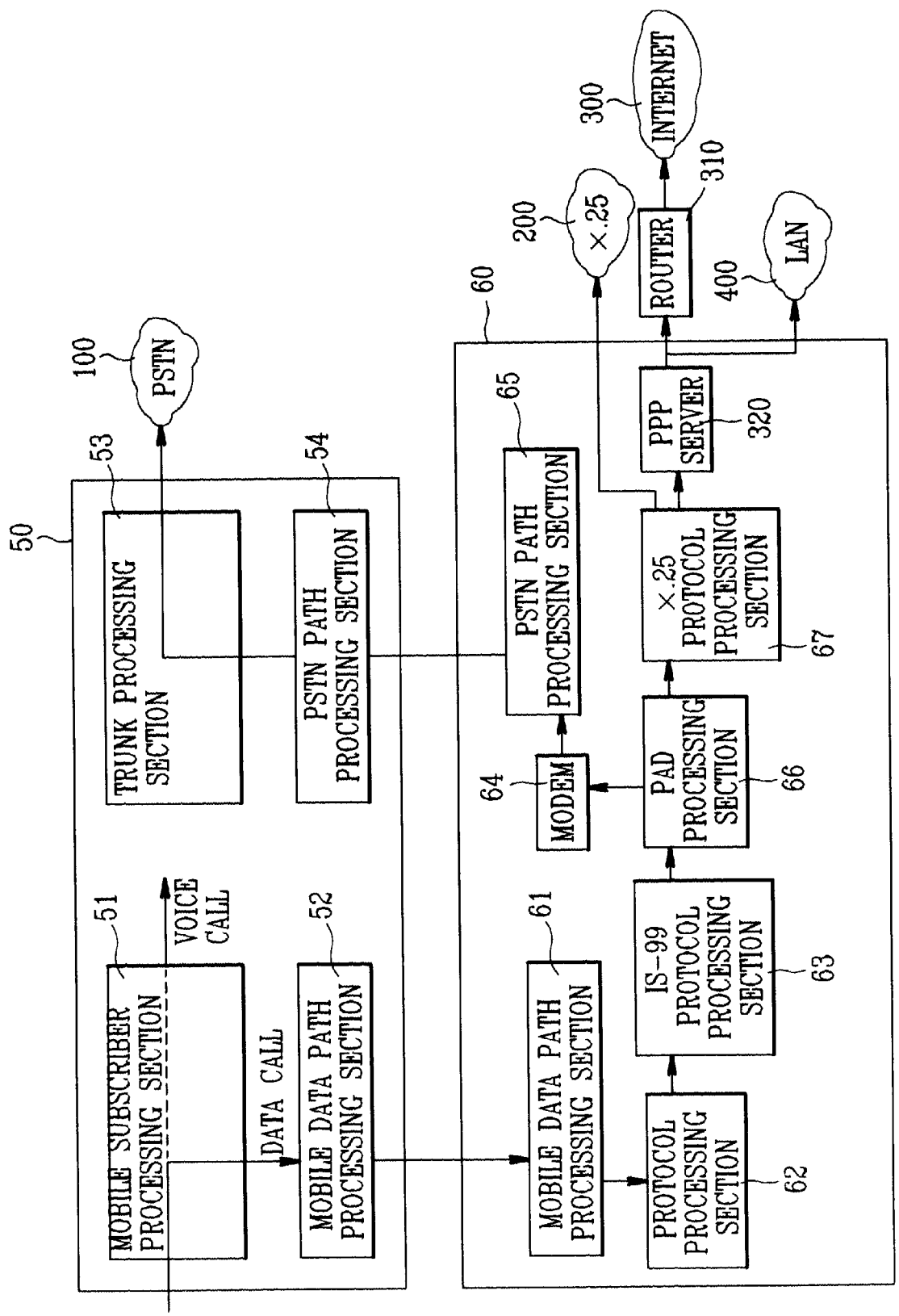
FIG. 4 is a block diagram explaining the call process operation during the asynchronous circuit data service in a CDMA type data communication system according to the present invention.

If the data terminal 10 of FIG. 3 requests the asynchronous circuit data service by the user's selection of the service option (ST1), the mobile terminal 20 connected to the data terminal 10 is connected to the mobile subscriber processing section 61 of the mobile switching center 50 through the base station controller 40 as shown in FIG. 4. Specifically, the user of the mobile station (MS) is connected to the interworking function device 60 like a null modem so that the analysis of the terminating number and the transmission of the PAD service menu can be easily performed. The mobile subscriber processing section 51 of the mobile switching center 50 connects the call directly to the trunk processing section 53 if the user requests the voice service, while it connects with the mobile data path processing section 52 of the mobile switching center 50 if the user requests the data service. The mobile data path processing section 52 determines the connection mobile data path by performing data communications with the mobile data path processing section 61 of the interworking function device 60. The mobile terminal 20 and the protocol processing section 62 of the interworking function device 60 determine the PPP and TCP/IP protocol, so that a data transmission path is open between the data terminal 10 and the protocol processing section 62 of the interworking function device 60.

If the ATD command inputted by the user of the data terminal 10 is transmitted to the IS-99 protocol processing section 63 for processing the ATD command by EIA/TIA/IS-99 through the data transmission path formed between the mobile station (MS) and the protocol processing section 62, the IS-99 protocal processing section 63 extracts a next command following the ATD command (ST2), and then analyzes the recognized command (ST3) to transfer the terminating number following the ATD command to the PAD processing section 66. The PAD processing section 66 analyzes the terminating number and classifies the result of analysis into four cases: a first case that no terminating number exists following the ATD command; a second case that the number is the PAD terminating number stored in and then provided from the interworking function device 60; a third case that the number is the host number connective from the interworking function device 60; and a fourth case that the number is the terminating number which does not correspond to any of the above three cases.

The PAD processing section 66 performs the following extensive operations with respect to the above four cases.

In the first case that no terminal number exists as a result of analyzing the terminating number following the ATD command, the PAD processing section 66 transmits the PAD service menu pre-stored in the interworking function device 60 to the data terminal 10 through the pre-formed data transmission path (ST6). At this time, the user, watching the PAD service menu provided on the screen of the data terminal 10, selects the server connection menu number or Internet connection number, or inputs the terminating number desired to be connected according to the X.28 recommendations or only the terminating number. Here, the PAD service menu of the interworking function device 60 provided from the PAD processing section 66 provides both the host menu selection number for connecting with X.25 network 200 or Internet 300 and the IP host menu selection number for connecting with the public switching telephone network 100.

Accordingly, the PAD processing section 66 analyzes whether the number inputted by the user is the server connection menu selection number, Internet connection menu, terminal number inputted based on the X.28 recommendations, or only the terminating number (ST8).

If the number is the server connection menu selection number as a result of analysis, the PAD processing section 66 analyzes the menu selection number again. If the number corresponds to the IP server of the public switching telephone network 100 (for instance, the data terminal device (80a) of FIG. 3), the PAD processing section 66 seizes the communication modem 64 (ST7), and connects with the public switching telephone network path processing section 65 of the interworking function device 60 to connect with the public switching telephone network (ST9).

If the number is the host terminating number provided from the PAD menu as a result of analyzing the terminating number following the ATD command, the PAD processing section 66 discriminates if the number is the X.25 host number (ST4). At this time, if the number corresponds to the host connected to the X.25 network 200 (for instance, the data terminal device (80b) of FIG. 3), the PAD processing section 66 connects with the X.25 processing section 67 of the interworking function device 60 (ST5).

Meanwhile, if the number is the Internet connection selection menu as a result of analyzing the terminating number following the ATD command, the PAD processing section 66 of the interworking function device 60 informs the PPP server 320 of the interworking function device 60 that the Internet connection request is produced. At this time, the PPP server 320 of the interworking function device 60 and a mobile host (telephone connection networking program) determine the packet data link based on the PPP link management rule of RFC 1661 (ST10). At this time, if the PPP link control protocol (LCP) is open, the PPP server 320 of the interworking function device 60 allocates the IP to the mobile host by driving the PPP Internet protocol control protocol (IPCP) (ST11). The main function of the PPP Internet protocol control protocol (IPCP) is to allocate the IP to the mobile host, and this is conformable to the RFC 1332 regulations. As a result, the IP datagram is transmitted through the PPP link determined between the PPP server 320 of the interworking function device 60 and the mobile host, and the interworking function device 60 is connected to Internet 300 through the router 310 (ST12).

Figure 6:
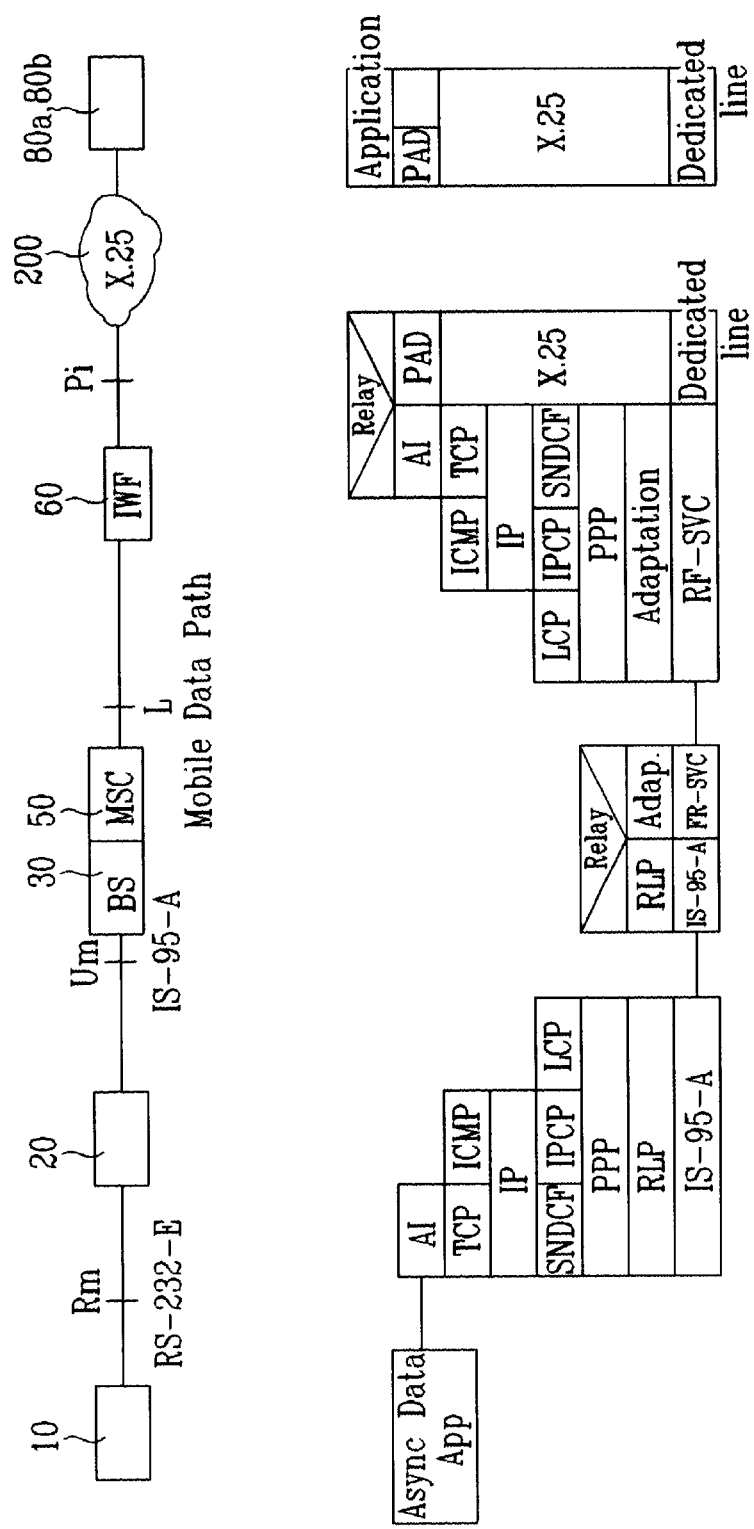
FIG. 6 is a view illustrating the structure of the X.25-connected asynchronous data circuit service protocol stack according to the present invention.
Figure 7:
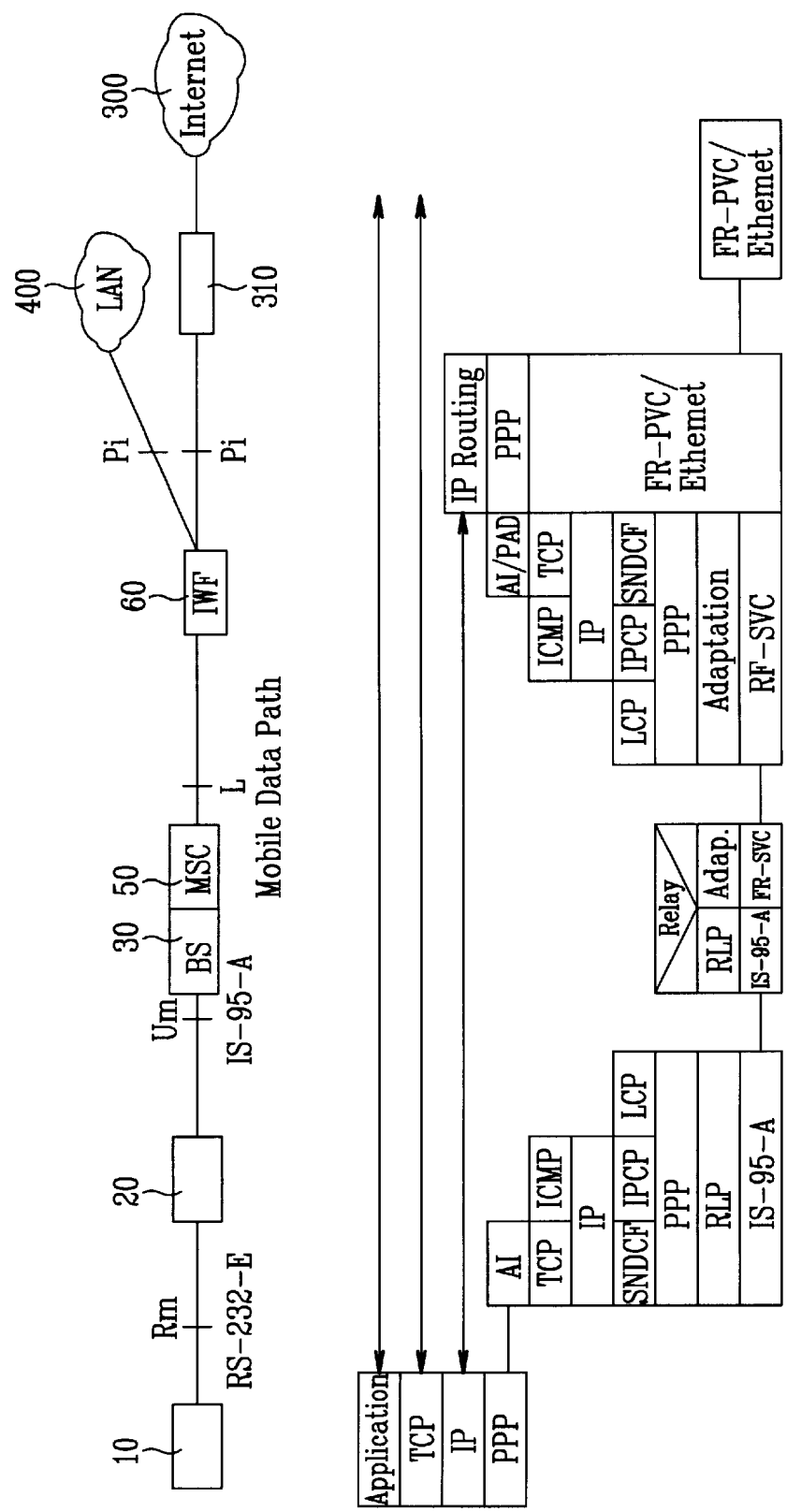
FIG. 7 is a view illustrating the structure of the Internet-connected asynchronous data circuit service protocol stack according to the present invention.
Figure 8:
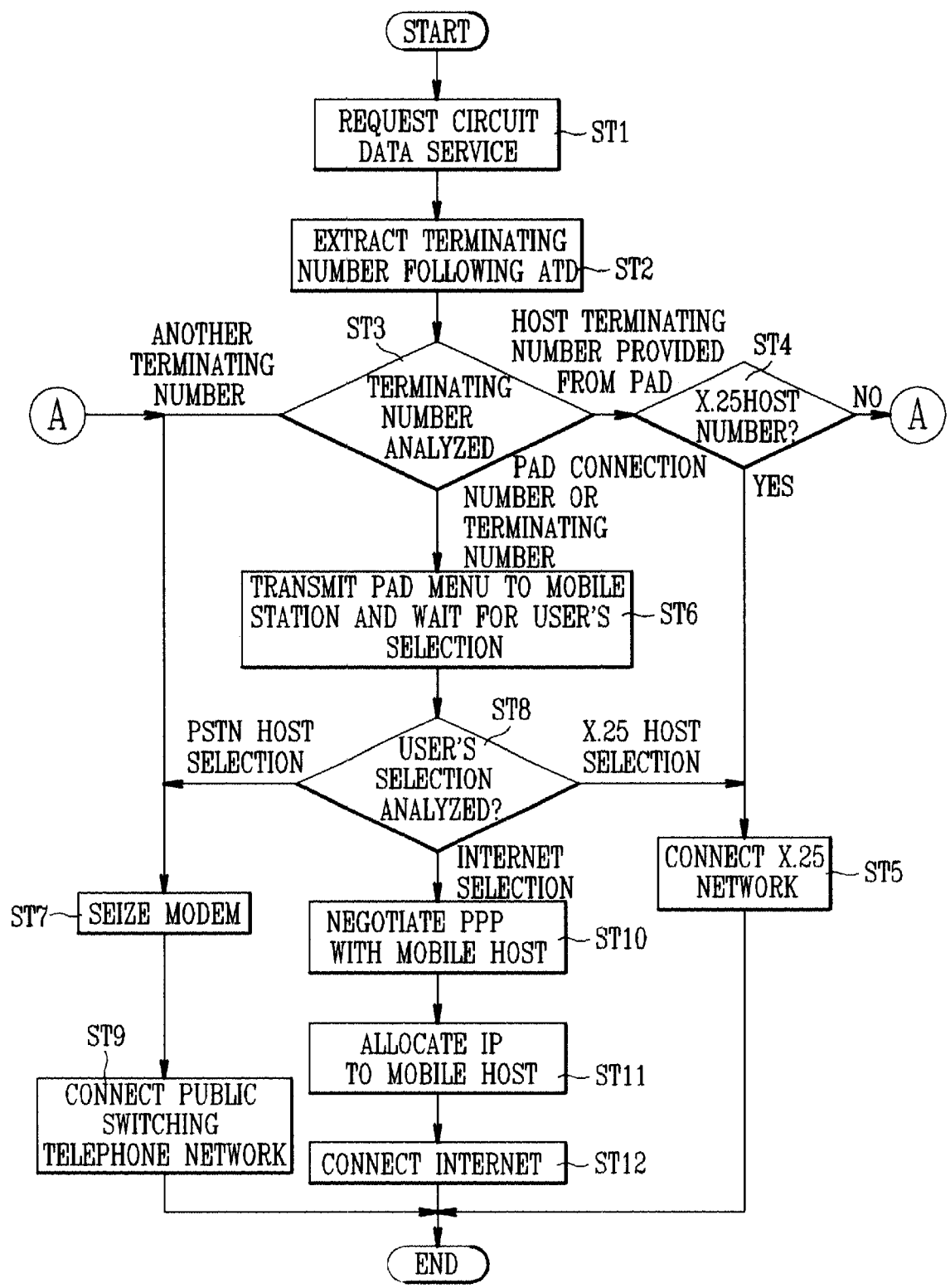
FIG. 8 is a flowchart explaining the call process operation during the asynchronous circuit data service in a CDMA type data communication system according to one embodiment of the present invention.

If the number is the terminal number inputted based on the X.28 recommendations as a result of analysis, the PAD processing section 66 attempts to connect with the X.25 network 200 by connecting with the X.25 processing section 67 of the interworking function device 60 using the X.25 connection asynchronous data service protocol as shown in FIG. 6.

Figure 5:
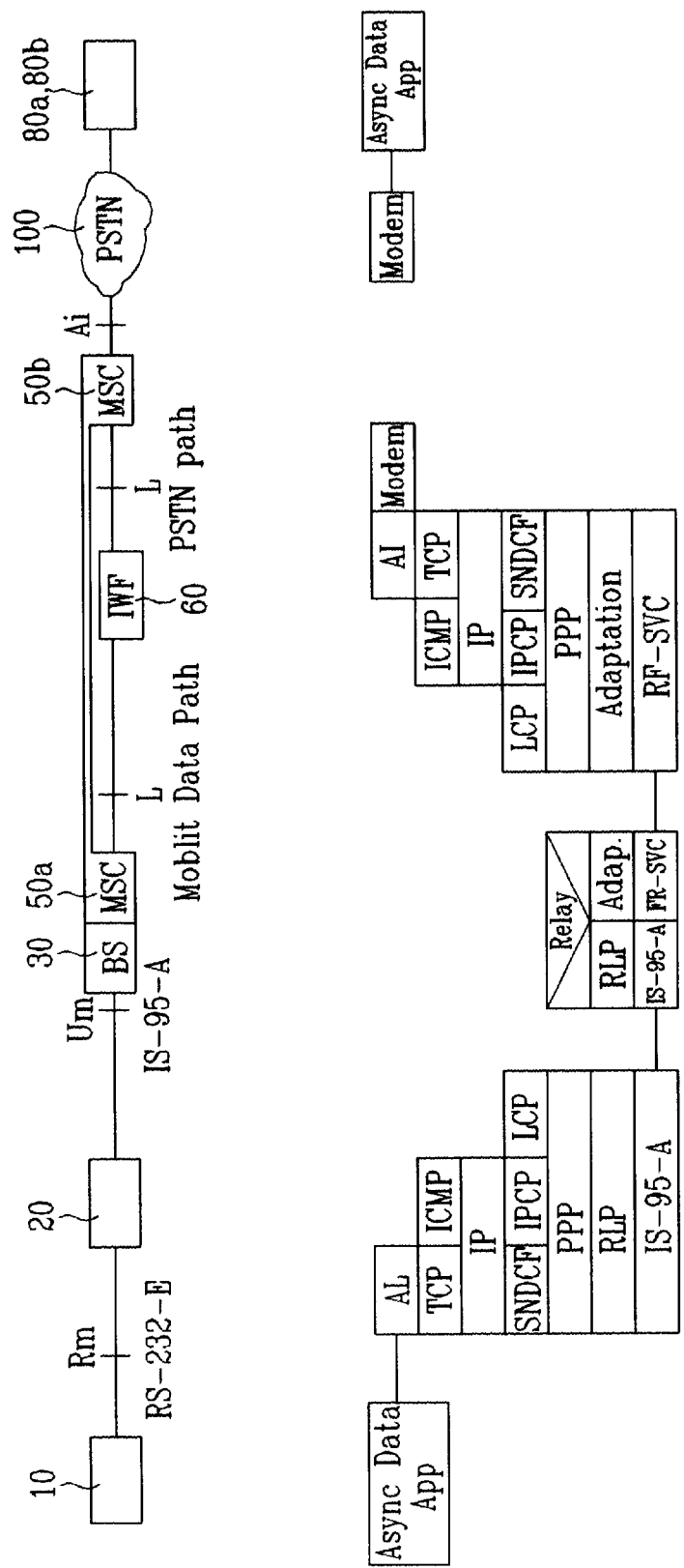
FIG. 5 is a view illustrating the structure of the asynchronous data circuit service protocol stack according to the present invention.

Meanwhile, if only the terminal number is inputted as a result of analysis, the PAD processing section 66 seizes the communication modem 64 using the asynchronous data service protocol as shown in FIG. 5, and then connects with the public switching telephone network path processing section 65 of the interworking function device 60.

In the second case that the number is the PAD terminating number provided from the interworking function device 60, the PAD processing section 66 performs the same operation as the first case that no terminating number is inputted.

In the third case that the number is the host number which can be connected by the interworking function device 60, the PAD processing section 66 does not transmits the PAD service menu provided from the interworking function device 60 to the data terminal 10, but directly connects the PAD service menu to the X.25 processing section 67. The X.25 processing section 67 attempts to connect to the X.25 network 200.

In the fourth case that the number is the terminating number which does not correspond to any of the above three cases, the PAD processing section 66 seizes the modem 64 of the interworking function device 60, and connects with the public switching telephone network path processing section 65 of the interworking function device 60. The path processing section 65 of the interworking function device 60 perform the same operation as the existing asynchronous circuit data service.

At this time, the PAD service menu provided from the interworking function device 60 is down-loaded from a personal computer (PC) or a workstation which serves to operate the interworking function device 60. Thus, the operator of the interworking function device 60 can optionally change the PAD service menu, and thereby the variableness and extension of the displayed menu can be provided.

As described above, the present invention enables the connection with the X.25 network and Internet by analyzing the terminating number by the PAD processing section as compared to the existing asynchronous data service. Also, in case that the user requests the connection with the public switching telephone network 100, the present invention can provide a user-attractive data service by providing the PAD service menu indicating that the user is connected to the interworking function device.

From the foregoing, the present invention can provide a asynchronous data communication service in a CDMA type data communication system by connecting with the X.25 network or Internet not provided by the existing recommendations as well as providing the connection with the public switching telephone network.

Also, according to the present invention, by extensively applying the PAD function to the interworking function device, the PAD service menu can provide a PAD menu selection number of the host connected to the X.25 network and Internet, the IP enterprise connected to the public switching telephone network, thereby providing a user-attractive data service in comparison to the prior art technique.

Also, according to the present invention, the user can select the IP terminating number provided through the PAD menu without inputting the IP terminating section number when the user wants to connect with the IP connected to the public switching telephone network during the asynchronous data service.

Also, according to the present invention, in case of processing the terminating call of the public switching telephone network, the user can identify the connection state with the interworking function device 60 with a waiting time faster than that in the wired network. Specifically, according to the prior art technique, the user can identify the connection state with the IP connected to the public switching telephone network after the time period required for the connection of the mobile terminal to the interworking function device, the protocol (PPP and TCP/IP) negotiation, and the negotiation between the modem of the interworking function device and the modem connected to the public switching telephone network. However, according to the present invention, the user of the mobile terminal can see the PAD service menu before the modem negotiation by applying an extensive PAD function. Practically, the user can see the response menu of about 4 to 7 seconds faster than that in the wired network.

While the present invention has been described and illustrated with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. An interworking function of a data communication, comprising:
   an IS-99 protocol processing section configured to analyze the terminating information inputted by the user;
   a packet assembler deassembler (PAD) processing section configured to receive the terminating information extracted by the IS-99 protocol processing section, and transmit to the mobile station a PAD service menu stored therein, or determine whether a terminating number included in the terminating information corresponds to a subscriber of a public switching telephone network, X.25 network, or Internet;

an X.25 protocol processing section to connect a communication path to the X.25 network while bypassing a modem of the interworking function device if the terminating number is determined by the PAD processing section to correspond to the subscriber of the X.25 network; and a point-to-point protocol (PPP) server to determine a packet data link between the mobile station and the Internet if the terminating number is determined by the PAD processing section to correspond to the Internet, wherein the PAD processing section analyzes the terminating number following the ATD command, and classifies a result of analysis into at least one of a case that no terminal number is inputted, a case that a terminating number stored in the PAD service menu is inputted, a case that a host number of the X.25 network is imputted, and a case that the terminating number which does not correspond to any of the above three cases is inputted, and wherein the data communication system characterized in that if a certain mobile station requests a data service, the data communication system analyzes the condition of terminating information inputted by a user of the mobile station, and selectively connects the mobile station to one of the public switched telephone network, the X.25 network, and Internet based on a result of the analysis, wherein if the result of the analysis indicates a connection to one of the X.25 network and the Internet, the data communication system by passes a modem of an interworking function device to connect the mobile station to the corresponding one of the X.25 network and the Internet.

2. The data communication system as claimed in claim 1, wherein the terminating information is a terminating number following an ATD command.

3. The data communication system as claimed in claim 1, wherein the IS-99 protocol processing section and the PAD processing section are provided on the same hardware.

4. The data communication system as claimed in claim 1, wherein the PAD service menu comprises a host menu selection number for connecting to the X.25 network, a selection number of the Internet, and an IP host menu selection number for connecting to the public switching telephone network.

5. The data communication system as claimed in claim 1, wherein the PAD service menu is down-loaded from a personal computer or a workstation which serves to operate the interworking function device.

6. The data communication system as claimed in claim 5, wherein the PAD service menu is optionally changed by an operator of the interworking function device.

7. The data communication system as claimed in claim 1, wherein if no terminal number is inputted as a result of analyzing the terminating number following the ATD command, the interworking function device transmits the PAD service menu to the mobile station so that the user of the mobile station selects or inputs a desired terminating number.

8. The data communication system as claimed in claim 7, wherein the terminating number is inputted according to recommendations of ITU-T X.28, or only the terminating number is directly inputted.

9. The data communication system as claimed in claim 1, wherein if the terminating number stored in the PAD service menu is inputted as a result of analyzing the terminating number following the ATD command, the PAD processing section discriminates whether the terminating number corresponds to a subscriber of the public switching telephone network, X.25 network, or Internet.

10. The data communication system as claimed in claim 1, wherein if the host number of the X.25 network is inputted as a result of analyzing the terminating number following the ATD command, the interworking function device connects a communication path to the X.25 network while bypassing the modem of the interworking function device.

11. The data communication system as claimed in claim 1, wherein the terminating number corresponding to a direct terminating call not by an ITU-T X.28 command or a terminating call of the public switching telephone network is inputted by the user as a result of analyzing the terminating number following the ATD command, the PAD processing section extracts the corresponding terminating number to provide the data service.

12. The data communication system as claimed in claim 1, wherein if the selection number of the Internet is inputted as a result of the user's selection from the PAD service menu, the interworking function device connects a communication path to the Internet through the PPP server and bypasses the modem of the interworking function device.

13. The data communication system as claimed in claim 1, wherein the mobile station comprises a mobile phone combined with a data terminal, the data terminal being one of a notebook computer, a personal digital assistant (PDA), a laptop computer, a palmtop computer, a portable computer, and a compact computer.

14. A data communication operating method, comprising:
determining a data transmission path between a mobile station and an interworking function device when the mobile station requests a data service;
analyzing a condition of terminating information inputted by a user of the mobile station, wherein the condition of the terminating information corresponds to one of a case that no terminal number is inputted, a case that a terminating number stored in a PAD service menu is inputted, a case that a host number of the X.25 network is inputted, and a case that the terminating number which does not correspond to any of the above three cases is inputted; and
selectively connecting the mobile station to a public switched telephone network (PSTN), a X.25 network, and Internet according to a result of analyzing the condition of the terminating information wherein if the result indicates a connection to one of the X.25 network and the Internet, the connection is performed by bypassing the PSTN.

15. The data communication operating method of claim 14, wherein if no terminal number is inputted, an interworking function device transmit a predetermined PAD service menu to the mobile station so that a user of the mobile station selects or inputs a desired terminating number.

16. The data communication operating method of claim 14, wherein the PAD service menu provides both a host menu selection number for connecting with the X.25 network and Internet, and an IP host menu selection number for connecting with the public switched telephone network.

17. The data communication operating method of claim 15, wherein the user of the mobile station selects a desired number among the terminating numbers provided from the PAD service menu, inputs a desired number in accordance with an X.28 recommendation, or directly inputs only the terminating number.

18. The data communication operating method of claim 14, wherein if the user inputs the terminating number corresponding to a direct terminating call not by an ITU-T X.28 command or a terminating call of a public switched telephone network, a PAD processing section extracts the terminating number to provide a data communication service.

19. The data communication operating method of claim 14, wherein if the terminating number stored in the PAD service menu is inputted, the mobile station is connected to the public switched telephone network or the X.25 network connecting with a corresponding subscriber.

20. The data communication operating method of claim 14, wherein if the host number of the X.25 network is inputted as a result of analyzing the terminating number following the ATD command, a communication path of the mobile station is connected to the X.25 network.

21. The data communication operating method of claim 14, wherein if the terminating number does not correspond to any of the case that no terminal number is inputted, a case that a terminating number stored in a PAD service menu is inputted, a case that a host number of the X.25 network is inputted, the communication path of the mobile station is automatically connected to the public switched telephone network.

22. The data communication operating method of claim 14, further comprising:
  determining a mobile data path between the mobile station and a mobile switching center in accordance with the data service request of the mobile station prior to determining the data transmission path; and
  determining a protocol between the mobile station and the interworking function device.

23. The data communication operating method of claim 14, wherein a user of the interworking function device connects with the interworking function device like a null modem.

24. The data communication operating method of claim 14, wherein a PAD service menu stored in the interworking function device is transmitted to the mobile station prior to a negotiation with a modem connected to a public switching telephone network.

25. The method of claim 24, wherein the modem is bypassed when a connection to the X.25 network or the Internet is to be made.

26. The data communication system of claim 1, wherein if the result of the analysis indicates a connection to one of the X.25 network and the Internet, the data communication system bypasses a modem of an interworking function device to connect to the corresponding one of the X.25 network and the Internet.

27. The method of claim 14, wherein if the result indicates a connection to one of the X.25 network and the Internet, the data communications system bypasses a modem of the interworking function device to connect to the corresponding one of the X.25 network and the Internet.

28. A communication system for providing data communications service, comprising:
  a mobile switching center, configured to receive terminating information from a mobile station;
  an interworking function device coupled to the mobile switching center, and configured to analyze the terminating information to selectively connect the mobile station to one of a public switched telephone network, an X.25 network, and Internet according to the result of the analysis, wherein if a result of the analysis indicates a connection to one of the X.25 network and the Internet, the interworking function device bypasses a modem of the interworking function device to connect the mobile station to the corresponding one of the X.25 network and the Internet, wherein the interworking function device further comprises,
    an IS-99 protocol processing section configured to analyze the terminating information inputted by the user;
    a packet assembler/disassembler (PAD) processor configured to analyze the terminating information and connect the mobile station to one of the modern of the interworking function device and a protocol processing device according to a result of the analysis, the PAD processor to being further configured to receive the terminating information extracted by the IS-99 protocol processing section, and transmit to the mobile station a PAD service menu stored therein, and determine whether a terminating number included in the terminating information corresponds to a subscriber of a public switching telephone network, the X.25 network, or the Internet, and further configured to analyze the terminating number and classify a result of the analysis into one of a case that no terminal number is inputted, a case that a terminating number stored in the PAD service menu is inputted, a case that a host number of the X.25 network is inputted, and a case that the terminating number which does not correspond to any of the above three cases is inputted;
    X.25 protocol processing section to connect a communication path to the X.25 network if the terminating number is determined by the PAD processor to correspond to the subscriber of the X.25 network; and
    a point-to-point protocol (PPP) server to determine a packet data link between the mobile station and the Internet if the terminating number is determined by the PAD processor to correspond to the Internet.

29. This system of claim 28, wherein the modem of the interworking function device is coupled to a public switched telephone network.

30. The system of claim 28, wherein the protocol processing section is coupled to one of a point-to-point protocol (PPP) server and the X.25 network.

31. The system of claim 28, wherein the PAD service menu comprises a host menu selection number for connecting to the X.25 network, a selection number of the Internet and an IP host menu selection number for connecting to the public switching telephone network.

32. The system of claim 28, wherein if the result of the analysis indicates a connection to one of the X.25 network and the Internet, the interworking function device bypasses a public switched telephone network to connect the mobile station to the corresponding one of the X.25 network and the Internet.

33. The system of claim 28, further comprising a data terminal coupled to the mobile station to provide data to be transmitted, when the data terminal is one of a notebook computer, a personal digital assistant (PDA), a laptop computer, a palmtop computer, a portable computer, and a compact computer.

* * * * *